(12) United States Patent
Benson et al.

(10) Patent No.: US 8,746,104 B2
(45) Date of Patent: *Jun. 10, 2014

(54) GEAR ABSOLUTE POSITION SENSOR FOR MANUAL TRANSMISSIONS

(71) Applicant: GM Global Technology Operations LLC, Detroit, MI (US)

(72) Inventors: Christopher G. Benson, Rochester Hills, MI (US); William L. Cousins, Ortonville, MI (US); Bradford W. Bur, Clarkston, MI (US); Kevin O'Connor, Lake Mills, WI (US); Mark Pickhard, Lake Mills, WI (US); Steven R. Stuve, Lake Mills, WI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/945,510

(22) Filed: Jul. 18, 2013

(65) Prior Publication Data

US 2013/0300403 A1   Nov. 14, 2013

Related U.S. Application Data

(63) Continuation of application No. 13/284,233, filed on Oct. 28, 2011.

(51) Int. Cl.
| | |
|---|---|
| *B60K 20/00* | (2006.01) |
| *B60K 17/04* | (2006.01) |
| *B60K 17/12* | (2006.01) |
| *F16H 59/04* | (2006.01) |
| *G05G 9/00* | (2006.01) |
| *G01B 7/14* | (2006.01) |
| *G01B 7/30* | (2006.01) |

(52) U.S. Cl.
USPC .. 74/473.1; 74/473.12; 74/473.3; 324/207.23

(58) Field of Classification Search
USPC ........... 74/335, 473.1, 473.12, 473.3, 473.33, 74/473.34, 469; 324/173, 174, 324/207.11–207.25; 338/32 H; 340/456; 477/101, 111; 701/53, 104
See application file for complete search history.

(56) References Cited

U.S. PATENT DOCUMENTS 4,371,051 A * 2/1983 Achterholt ..................... 180/271
4,488,455 A * 12/1984 Shetler et al. ................... 477/90
(Continued)

FOREIGN PATENT DOCUMENTS

| DE | 19908036 A1 | 8/2000 |
|---|---|---|
| DE | 19924995 A1 | 12/2000 |
| GB | 2466040 A | 6/2010 |

*Primary Examiner* — Troy Chambers
*Assistant Examiner* — Jake Cook

(57) ABSTRACT

The present invention provides a gear absolute position sensor assembly (GAPS) that senses the current absolute, position of the shift lever of a manual transmission. The sensor assembly provides data to an associated electronic controller such as an engine control module (ECM) regarding the current position of the shift lever, such as an engaged gear. The sensor assembly preferably comprises at least one Hall effect or other type of magnetic field (proximity) sensors in combination with an application specific integrated circuit (ASIC) which is supplied with data from the sensors, decodes the output of the sensors and provides an output identifying a specific engaged gear or neutral for use by vehicle or engine management electronics. The sensors are mounted proximate the shift linkage at a location where they can sense both rotation and translation.

13 Claims, 5 Drawing Sheets

(56) References Cited

U.S. PATENT DOCUMENTS

| | | | |
|---|---|---|---|
| 6,367,344 B1 * | 4/2002 | Vogt et al. | 74/335 |
| 6,382,045 B1 * | 5/2002 | Wheeler | 74/473.12 |
| 7,449,878 B2 * | 11/2008 | Lee | 324/207.23 |
| 2004/0104719 A1 * | 6/2004 | Johnson et al. | 324/207.21 |
| 2008/0074104 A1 * | 3/2008 | Sauer et al. | 324/207.22 |
| 2008/0078604 A1 * | 4/2008 | Ersoy et al. | 180/336 |
| 2012/0152049 A1 | 6/2012 | Benson et al. | |

* cited by examiner

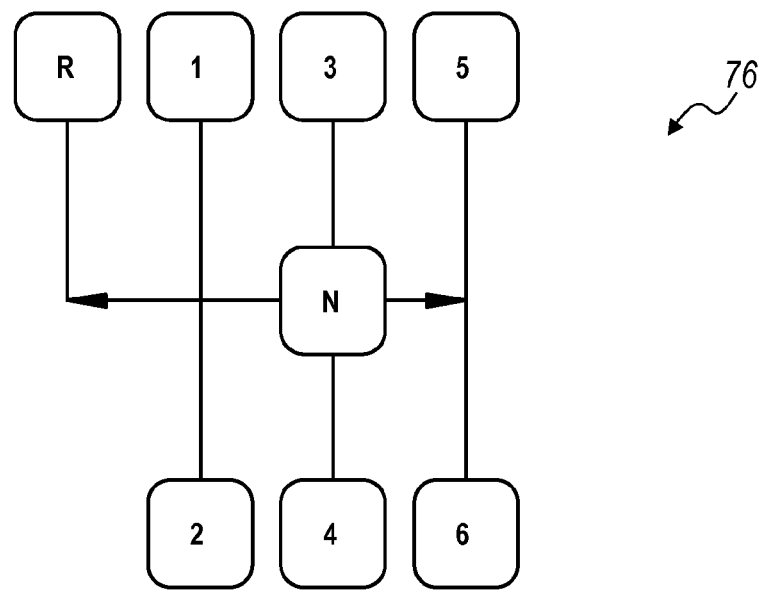
FIG. 4
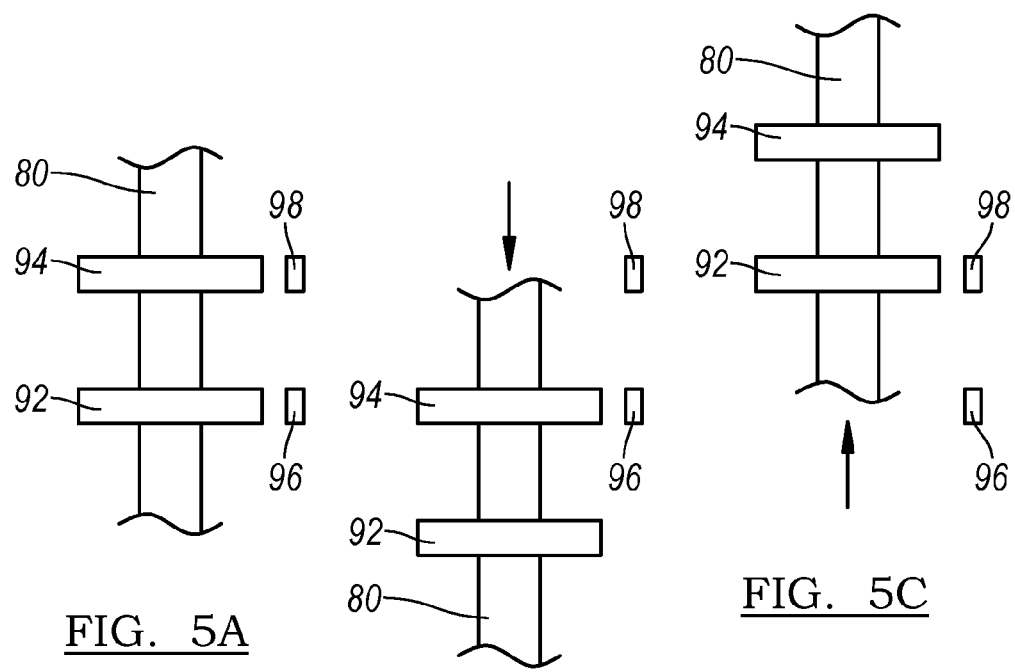
FIG. 5A
FIG. 5B
FIG. 5C

| | | SHAFT (80) POSITION | | | |
|---|---|---|---|---|---|
| | | ROTATION (FROM REAR) | | TRANSLATION | |
| | | CLOCKWISE (deg.) | COUNTER CLOCKWISE (deg.) | FORWARD (mm) | REVERSE (mm) |
| GEAR POSITION (FIG 4) | NEUTRAL | 6.5/8.0 | 13.0/14.5 | 0 | 0 |
| | REVERSE | | 13.0/14.5 | | 8.1/9.4 |
| | 1ST | | 6.5/8.4 | | 8.1/9.4 |
| | 2ND | | 6.5/8.4 | 8.18/9.32 | |
| | 3RD | 0 | 0 | | 8.1/9.4 |
| | 4TH | 0 | 0 | 8.18/9.32 | |
| | 5TH | 6.5/8.0 | | | 8.1/9.4 |
| | 6TH | 6.5/8.0 | | 8.18/9.32 | |

GEAR ABSOLUTE POSITION SENSOR FOR MANUAL TRANSMISSIONS

CROSS-REFERENCE TO RELATED APPLICATION

This application is a continuation of U.S. application Ser. No. 13/284,233, filed on Oct. 28, 2011, which claims the benefit of U.S. Provisional Application No. 61/425,626, filed Dec. 21, 2010. The disclosure of the above applications are incorporated herein by reference in their entireties.

FIELD

The present disclosure relates to a gear absolute position sensor (GAPS) for manual transmissions and more particularly to a gear absolute position sensor for manual transmissions for engine speed matching and engine start-stop applications.

BACKGROUND

The statements in this section merely provide background information related to the present disclosure and may or may not constitute prior art.

The trend of automatic motor vehicle transmissions for passenger cars, sport utility vehicles, pickup trucks and other consumer vehicles from substantially full hydraulic operation to operation under the control of an electronic transmission control module (TCM) and hydraulic actuators has been accompanied by both the desire and necessity of providing electronic linear position sensors which provide real time data to the transmission control module regarding the current positions of the actuators, the associated shift linkages and the clutches, brakes and gears acted upon. Such data is utilized by the transmission control module to confirm, for example, the commencement and completion of a shift and thus the overall state of the transmission. Such data is also useful for self-diagnosis of impending or actual component failure.

This trend has not been taken up by the other significant class of motor vehicle transmissions, namely, manual transmissions. As the name suggests, such transmissions are manually shifted by the vehicle operator. Since shift timing and gear selection are left to the vehicle operator, the incorporation of various sensors in a manual transmission has been viewed as not only unnecessary but as an invasion of the operator's freedom.

Nonetheless, it is apparent that data regarding the current operating state of a manual transmission can be utilized by associated electronic controllers to improve the overall driving experience. The present invention is so directed.

SUMMARY

The present invention provides a gear absolute position sensor assembly (GAPS) that senses the absolute, current shift lever position or chosen or engaged gear of a manual transmission. The sensor assembly provides data to an associated electronic controller such as an engine control module (ECM). The sensor assembly preferably comprises two Hall effect or other type of magnetic field (proximity) sensors in combination with an application specific integrated circuit (ASIC) which is supplied with data from the sensors, decodes the output of the sensors and provides an output identifying a specific engaged gear or neutral for use by vehicle or engine management processors. The sensors are mounted proximate the shift linkage at a location where they can sense both rotation and translation.

The sensor assembly may be utilized with four, five, six or more speed and gear ratio manual transmissions. Use of the sensor assembly enables engine and transmission speed matching which reduces clutch wear and provides improved shift quality. The sensor assembly also enables engine start-stop capability as well as remote start for a manual transmission by, inter alia, detecting when the transmission is in neutral. The sensors and the application specific integrated circuit also provide full diagnostic capability.

Thus it is an aspect of the present invention to provide an absolute gear position sensor assembly for a manual transmission.

It is a further aspect of the present invention to provide a gear absolute position sensor (GAPS) for a manual transmission.

It is a still further aspect of the present invention to provide an absolute gear position sensor assembly for a manual transmission having two magnetic proximity sensors.

It is a still further aspect of the present invention to provide an absolute gear position sensor assembly for a manual transmission having two Hall effect sensors.

It is a still further aspect of the present invention to provide an absolute gear position sensor assembly for a manual transmission having an application specific integrated circuit.

It is a still further aspect of the present invention to provide an absolute gear position sensor assembly for a manual transmission having two sensors mounted proximate the shift linkage.

It is a still further aspect of the present invention to provide an absolute gear position sensor assembly for a manual transmission having four, five, six or more speeds or gear ratios.

It is a still further aspect of the present invention to provide an absolute gear position sensor assembly for a manual transmission having full diagnostic capability.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a plan view of a typical and representative six speed manual transmission shift gate ("H") pattern;

FIGS. 5A, 5B and 5C are diagrammatic views of the gear shift linkage and sensors according to the present invention in neutral, a forward gate position for odd numbered gears and a rearward gate position for even numbered gears, respectively;

DETAILED DESCRIPTION

The following description is merely exemplary in nature and is not intended to limit the present disclosure, application, or uses.

Figure 1:
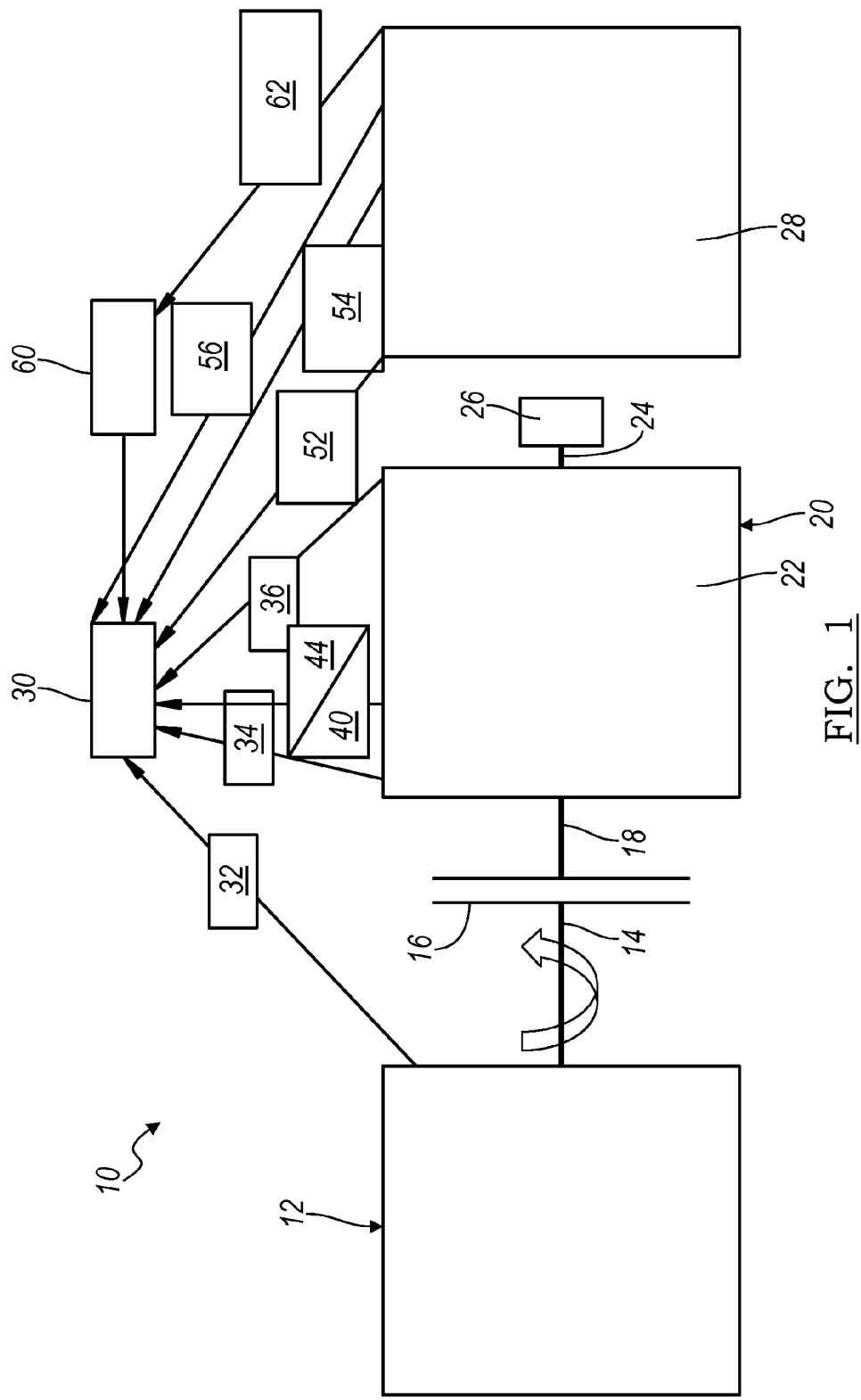
FIG. 1 is block diagram of the relevant electrical, electronic and mechanical components of a motor vehicle having a manual transmission and equipped with the present invention.

With reference to FIG. 1, the relevant electrical, electronic and mechanical components of a motor vehicle having a manual transmission equipped with the present invention are illustrated and generally designated by the reference number 10. The components 10 include a prime mover 12 which may be a gasoline, Diesel or flex fuel engine, or a hybrid or electric power plant. The prime mover 12 includes an output shaft 14 which drives a main friction clutch 16 which is typically, though not necessarily, engaged and disengaged by the vehicle operator (not illustrated). The main clutch 16 selectively provides drive torque to an input shaft 18 of a manual transmission 20. The manual transmission 20 may be conventional and includes a housing 22 as well as shafts, gears and synchronizer clutches (all not illustrated) which cooperatively provide, for example, four, five, six or more forward speeds or gear ratios and reverse. The transmission includes an output shaft 24 which is coupled to a final drive assembly 26 which may include, for example, a propshaft, a differential assembly and a pair of drive axles. A driver interface 28 generally includes those controls and devices under the control of and operated by the vehicle operator (not illustrated).

The components 10 also include a plurality of electric and electronic sensors which provide real time data to an engine control module (ECM) 30. For example, an electronic sensor (tachometer) 32 disposed in the prime mover 12 provides a signal representing the current speed of the output shaft 14 of the prime mover 12. A transmission input speed sensor (TISS) 34 senses the instantaneous speed of the input shaft 18 of the manual transmission 20. A transmission output speed sensor (TOSS) 36 senses the instantaneous speed of the output shaft 24 of the manual transmission 20. A gear absolute shift position sensor assembly 40 according to the present invention includes an application specific integrated circuit 44, the data output of which indicates the current position of a shift lever 72. A clutch position sensor 52 senses the position of the main clutch 16. A throttle position sensor 54 senses the instantaneous position of a throttle pedal (not illustrated). A brake pedal position sensor 56 sense the position of a brake pedal (also not illustrated). A body control module (BCM) 60 receives data from one or more control switches 62 and includes a data output to the engine control module 30.

Figure 2:
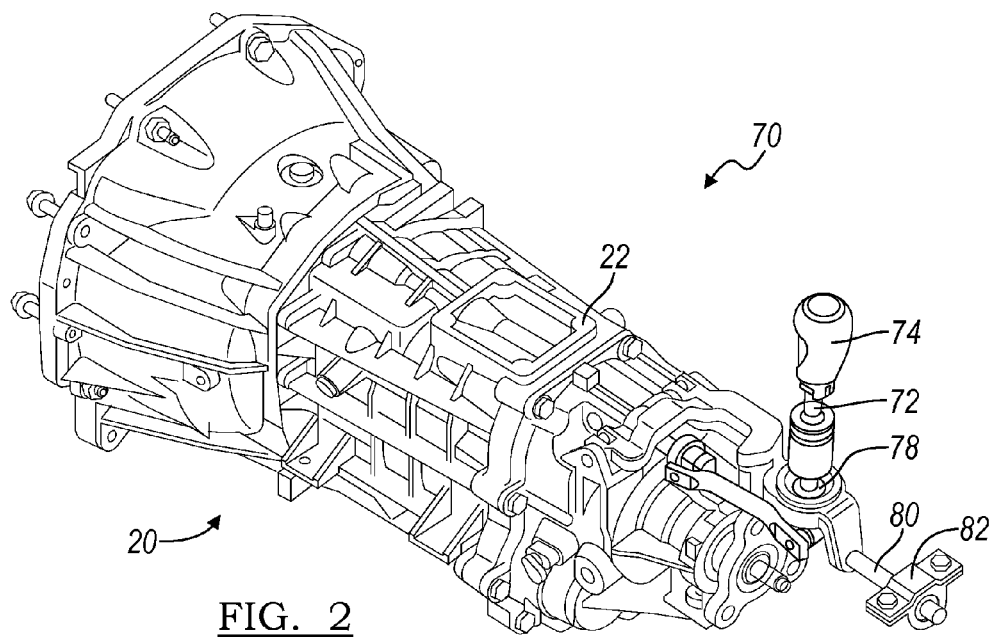
FIG. 2 is a perspective view of a portion of a manual transmission including a shift linkage incorporating the present invention.
Figure 3:
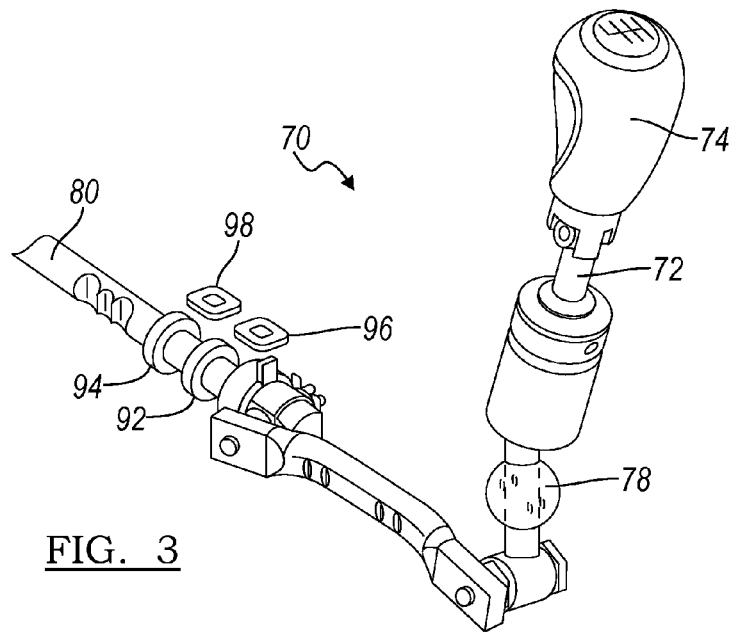
FIG. 3 is an enlarged view of a manual transmission shift linkage incorporating the present invention.

Referring now to FIGS. 2, 3 and 4, attached to the exterior of the housing 22 of the manual transmission 20 is a shift linkage 70. The shift linkage 70 includes a shift lever 72 which terminates in a shift ball or handle 74 that is engaged and manipulated by the vehicle operator. The shift lever 72 is moveable through a virtual or actual shift gate or "H" pattern 76, illustrated in FIG. 4, which facilitates selection of, separates and creates tactile feedback for six forward gears or speed ratios and reverse. It should be understood, however, that the manual transmission 20 with which the present invention is utilized may incorporate and provide more or fewer gears or speed ratios. The shift lever 72 is disposed in a ball pivot 78 and coupled to a longitudinally oriented shaft 80 which is supported by various mounting members or brackets and bearings 82 which allow it to translate fore and aft and rotate about its axis.

Referring now to FIGS. 3, 5A, 5B and 5C, the gear absolute position sensor assembly 40 includes a first arc magnet or ring 92 and a spaced apart second arc magnet or ring 94, both secured to the longitudinally oriented shaft 80. In the neutral position of the shift linkage 70 illustrated in FIG. 5A, a first Hall effect sensor 96 is disposed proximate, but preferably not in contact with the first arc magnet or ring 92 and a second Hall effect sensor 98 is disposed proximate, but preferably not in contact with, the second arc magnet or ring 94. The outputs of the first Hall effect sensor 96 and the second Hall effect sensor 98 are fed directly to the application specific integrated circuit 44 which may be formed and assembled integrally with the sensors 96 and 98 into a unitary device. Alternatively, a single arc magnet or ring and a proximate single three dimensional (3D) Hall effect sensor may be utilized in place of the two rings 92 and 94 and the two one dimensional (1D) Hall effect sensors 96 and 98.

It will be appreciated that the first and second arc magnets or rings 92 and 94 and the associated Hall effect sensors 96 and 98 may be mounted within the transmission housing 22, through the transmission housing 22 or at any convenient location where the rings 92 and 94 may be attached to the shaft 80 and the sensors 96 and 98 mounted proximately. For example, they may be mounted within or near the bracket or bearing 82 illustrated in FIG. 2. As an alternative to Hall effect sensors, anisotropic magneto resistance (AMR), giant magneto resistance (GMR), permanent magnet linear contactless displacement (PLOD), linear variable displacement transformer (LVDT), magneto elastic (ME) or magneto inductive (MI) sensors may be utilized.

FIG. 5B illustrates the position of the shaft 80 when the shift lever 72 is in a forward position in the shift gate 76, selecting, for example, reverse, first, third or fifth gears. Here, the first arc magnet or ring 92 is remote or spaced from both the first and the second Hall effect sensors 96 and 98 and the second arc magnet or ring 94 is in proximate, sensed relationship with the first Hall effect sensor 96. Rotation of the shaft 80 and the second arc magnet or ring 94 adjacent the first Hall effect sensor 96 changes or modulates the magnetic field strength sensed by the first Hall effect sensor 96 and this information is utilized by the application specific integrated circuit 44 to provide a data signal indicating the absolute, current gear shift position, as described more fully below.

FIG. 5C illustrates the position of the shaft 80 when the shift lever 72 is in a rearward position in the shift gate 76, selecting, for example, second, fourth or sixth gears. Here, the second arc magnet or ring 94 is remote or spaced from both the first and the second Hall effect sensors 96 and 98 and the first arc magnet or ring 92 is in proximate, sensed relationship with the second Hall effect sensor 98. Rotation of the shaft 80 and the first arc magnet or ring 92 adjacent the second Hall effect sensor 98 changes or modulates the magnetic field strength sensed by the second Hall effect sensor 98 and this information is utilized by the application specific integrated circuit 44 to provide a data signal indicating the absolute, current gear shift position, as described more fully below.

Figures 6, 7:
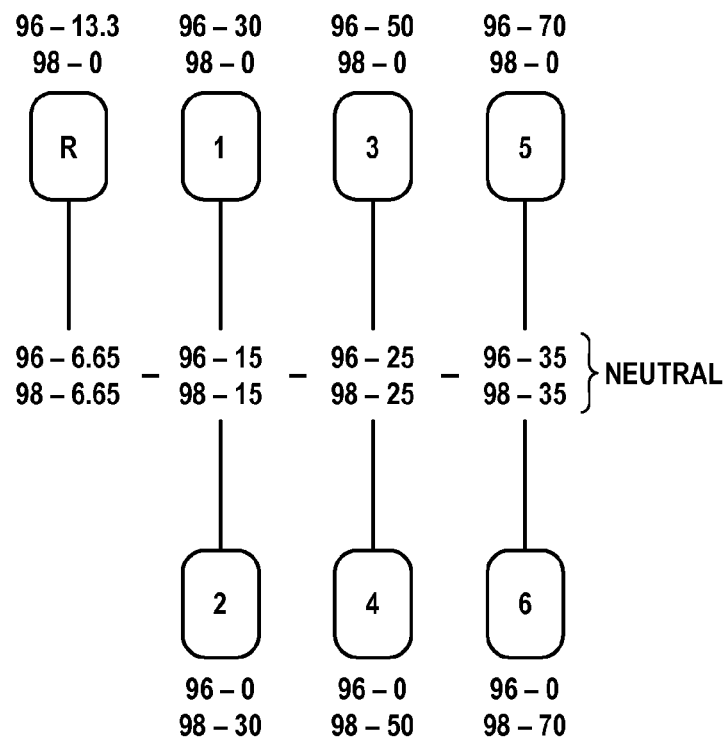
FIG. 6 is a chart presenting exemplary rotations and translations of the shift linkage of FIG. 3 associated with engaging the six forward speeds or gear ratios and reverse of the manual transmission illustrated in FIG. 2.
FIG. 7 is a diagram graphically illustrating the various positions of the shift linkage and the duty cycles (% PWM) of the two sensors corresponding to such positions according to the present invention.

Referring now to FIG. 6, the actual forward and rearward translations and clockwise and counterclockwise rotations of the shaft 80 relative to the neutral position are presented for each of the six forward speed or gear ratio positions and reverse. It should be appreciated that the translations and rotations presented in FIG. 6 are illustrative and exemplary only and that such numerical values may vary and be adjusted widely to accommodate various transmission sizes, configurations and designs including those having a different number of gears. It should also be appreciated that although the shift linkage 70 described herein functions with first selection (lateral) motion of the shift lever 72 followed by shift (longitudinal) motion (and first rotational motion of the shaft 80 and the magnet rings 92 and 94 and then longitudinal motion), the invention also encompasses a shift linkage 70 in which the shaft 80 and the magnet rings 92 and 94 first move longitudinally and then rotate in response to motion of the shift lever 72.

Referring now to FIG. 7, a diagram corresponding to the shift gate or "H" pattern 76 illustrated in FIG. 4, presents the PWM duty cycle output of the application specific integrated circuit 44 in percent for each of the Hall effect sensors 96 and 98 as a function of the location of the shift lever 72 and the shaft 80. Note, first of all, that for all neutral positions, the duty cycle output values for both the sensors 96 and 98 are identical, thus providing a useful integrity check on system and sensor operation. Second of all, in both forward positions in the shift gate pattern 76, selecting, for example, reverse, first, third or fifth gears, as illustrated if FIG. 5B, and rearward positions in the shift gate pattern 76, selecting, for example, second, fourth and sixth gears, as illustrated in FIG. 5C, one of the outputs of the Hall effect sensors 96 and 98 is always zero; the second Hall effect sensor 98 in the first instance and the first Hall effect sensor 96 in the second instance.

Figure 8:
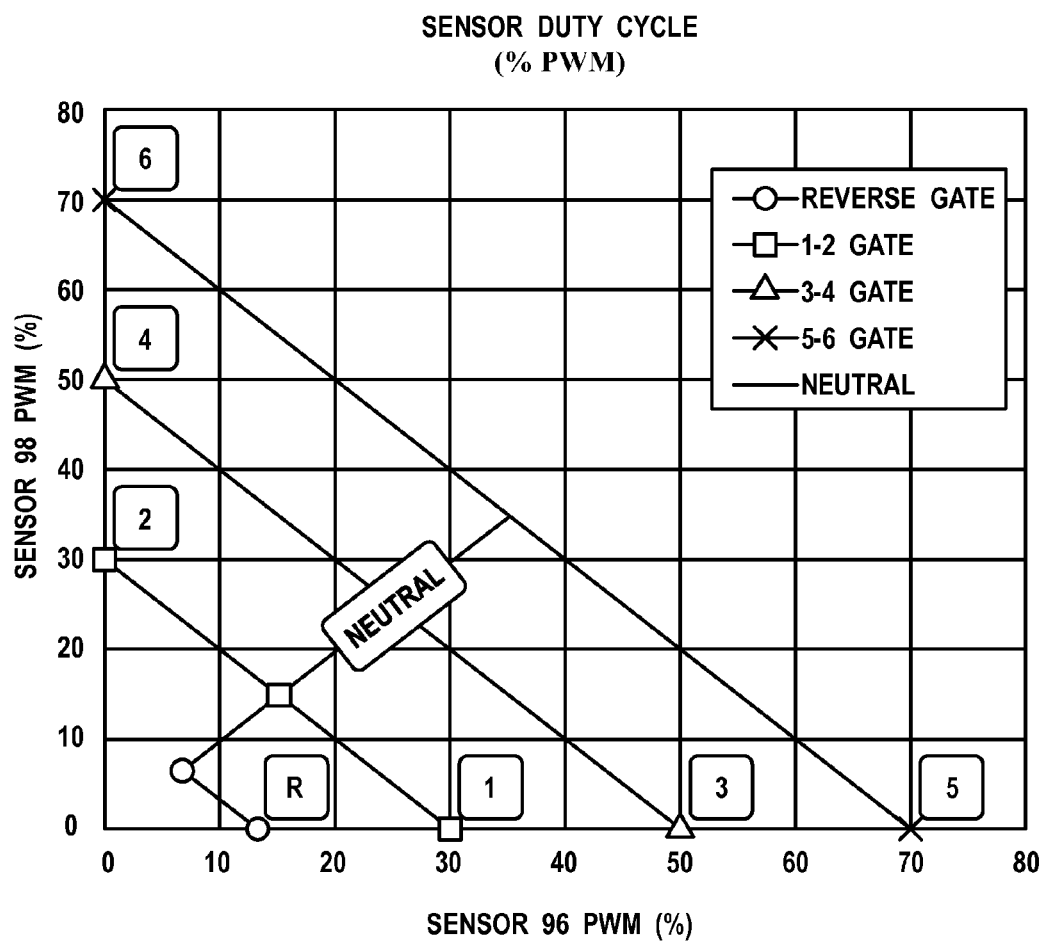
FIG. 8 is a graph illustrating the sensor duty cycle (% PWM) of the two sensors for various positions of the shift linkage according to the present invention.

Referring now to FIG. 8, a graph illustrates the actual continuous state output (PWM duty cycle in percent) of the application specific integrated circuit 44 from the first Hall effect sensor 96 along the horizontal (X) axis and the output of the application specific integrated circuit 44 from the second Hall effect sensor 98 along the vertical (Y) axis as the shaft 80 and the shift lever 72 move through the various positions of the shift gate pattern 76 while selecting one of the available gears or speed ratios. From this graph, as well as the data of FIG. 7, it will be appreciated that not only each gear selection position has a unique numerical value or signature but also that as the shift lever 72 is moved and the shaft 80 is translated and rotated, the outputs of the Hall effect sensors 96 and 98 and the application specific integrated circuit 44 provide a continuously varying, essentially analog, signal that permits the engine control module 30 or other, similar device to infer not only the present location of the shift lever 72 and the shaft 80 but also their direction of motion and the speed of such motion.

It should be appreciated that the gear absolute position sensor assembly 40 of the present invention provides and enables several benefits and features. For example, it supports engine start-stop applications inasmuch as they require neutral position detection. The invention improves shift quality and reduces driveline clunk by facilitating the pre-synchronization of the driveline. Additionally, matching of the speed of the engine output and transmission input, which requires absolute gear position and the anticipated gear, is possible. Torque management which may reduce transmission mass and complexity is also possible. Remote, i.e., unattended, starting is also facilitated since it, too, requires neutral position detection. Furthermore, the invention may be utilized to reduce or substantially eliminate abuse of the transmission as it may be utilized to sense and prevent a potentially abusive operational event. Finally, the invention provides full diagnostic capability, for example, short to power, short to ground and open circuit.

The description of the invention is merely exemplary in nature and variations that do not depart from the gist of the invention are intended to be within the scope of the invention. Such variations are not to be regarded as a departure from the spirit and scope of the invention.

What is claimed is:

1. A gear position sensor assembly for a manual transmission, the assembly comprising:
 a shift linkage having an operator engageable shift lever coupled to a shift member moveable first rotationally and then longitudinally from a neutral position to a first axially displaced position to select and engage one of a first plurality of gear ratios and to a second axially displaced position to select and engage one of a second plurality of gear ratios, said shift member including at least one magnet ring;
 at least one magnetic sensor disposed adjacent said magnet ring in said neutral position of said shift member, said magnetic sensor capable of sensing three dimensional motion of said magnet ring and providing a neutral indicating output, first outputs indicating said shift member is in said first axially displaced position and second outputs indicating said shift member is in said second axially displaced position; and
 an integrated circuit for receiving said outputs of said magnetic sensor and providing a signal indicating a current shift linkage position.

2. The gear position sensor assembly for a manual transmission of claim 1 wherein said at least one magnetic sensor is a three dimensional Hall effect sensor.

3. The gear position sensor assembly for a manual transmission of claim 1 wherein said application specific integrated circuit provides a PWM output.

4. The gear position sensor assembly for a manual transmission of claim 1 further including an engine control module having an input for receiving said signal from said application specific integrated circuit.

5. The gear position sensor assembly for a manual transmission of claim 1 wherein said shift linkage further includes an "H" pattern shift gate.

6. The gear position sensor assembly of claim 1 wherein said at least one magnet ring is most proximate said at least one magnetic sensor when said shift lever is in neutral.

7. A manual transmission comprising:
 a plurality of gears for producing a plurality of gear ratios;
 a gear position sensor assembly having:
  a shift linkage having an operator engageable shift lever coupled to a shift member moveable first rotationally and then longitudinally from a neutral position to a first axially displaced position to select and engage one of the plurality of gear ratios and to a second axially displaced position to select and engage another of said plurality of gear ratios, said shift member including a magnet ring;
  a magnetic sensor disposed adjacent said magnet ring in said neutral position of said shift member, said magnetic sensor capable of sensing three dimensional motion of said magnet ring and providing a neutral indicating output, first outputs indicating said shift member is in said first axially displaced position and second outputs indicating said shift member is in said second axially displaced position; and
  an integrated circuit for receiving said output of said magnetic sensor and providing a signal indicating a current shift linkage position.

8. The manual transmission of claim 7 wherein said magnetic sensor is a three dimensional Hall effect sensor.

9. The manual transmission of claim 7 wherein said application specific integrated circuit provides a PWM output.

10. The manual transmission of claim 7 further including an engine control module having an input for receiving said signal from said application specific integrated circuit.

11. The manual transmission of claim 7 wherein said shift linkage further includes an "H" pattern shift gate.

12. The manual transmission of claim 7 wherein said magnet ring is most proximate said magnetic sensor when said shift lever is in neutral.

13. The manual transmission of claim 7 wherein said magnetic sensor provides distinct first and second outputs for each of said plurality of gears.

\* \* \* \* \*